US009542252B2

(12) United States Patent
Uchiumi et al.

(10) Patent No.: US 9,542,252 B2
(45) Date of Patent: Jan. 10, 2017

(54) INFORMATION PROCESSING TECHNIQUE FOR SUPPORTING DATA SETTING

(71) Applicant: FUJITSU LIMITED, Kawasaki-shi, Kanagawa (JP)

(72) Inventors: Tetsuya Uchiumi, Kawasaki (JP); Yasuhide Matsumoto, Kawasaki (JP); Shinji Kikuchi, Yokohama (JP); Shinya Kitajima, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 14/488,397

(22) Filed: Sep. 17, 2014

(65) Prior Publication Data

US 2015/0006974 A1 Jan. 1, 2015

Related U.S. Application Data

(63) Continuation of application No. PCT/JP2012/064143, filed on May 31, 2012.

(51) Int. Cl.
G06F 11/00 (2006.01)
G06F 11/07 (2006.01)
(Continued)

(52) U.S. Cl.
CPC .......... G06F 11/0751 (2013.01); G06F 9/445 (2013.01); G06F 9/44505 (2013.01);
(Continued)

(58) Field of Classification Search
CPC .............. G06F 11/0751; G06F 11/0709; G06F 11/0754; G06F 11/3051; G06F 11/079; G06F 11/3006; G06F 11/3058; G06F 11/3438; G06F 9/445; G06F 9/44505; H04L 41/0869
(Continued)

(56) References Cited

U.S. PATENT DOCUMENTS 7,752,012 B2 * 7/2010 Kavaklioglu ........ C10G 11/187
702/179
7,840,854 B2 * 11/2010 Zhou ..................... G06F 11/079
714/33
(Continued)

FOREIGN PATENT DOCUMENTS

JP 63-156216 A 6/1988
JP 6-1423 B2 1/1994
(Continued)

OTHER PUBLICATIONS

International Search Report Issued on Jul. 10, 2012 for PCT/JP2012/064143 Filed on May 31, 2012 (English Language).

Primary Examiner — Joseph D Manoskey
(74) Attorney, Agent, or Firm — Oblon, McClelland, Maier & Neustadt, L.L.P.

(57) ABSTRACT

An information processing method for supporting data setting include: extracting a first feature value for each of plural parameters from first data that is data after at least one parameter value, which is included in second data that includes, for each of plural setting targets, each parameter value for each of the plural parameters, was changed; and extracting a parameter that is a candidate of an erroneously changed parameter based on a difference between a second feature value that is extracted, for each of the plural parameters, from the second data and a corresponding first feature value.

8 Claims, 19 Drawing Sheets

(51) Int. Cl.
*G06F 9/445* (2006.01)
*G06F 11/30* (2006.01)
*H04L 12/24* (2006.01)

(52) U.S. Cl.
CPC ...... *G06F 11/0709* (2013.01); *G06F 11/0754* (2013.01); *G06F 11/3051* (2013.01); *H04L 41/0869* (2013.01)

(58) Field of Classification Search
USPC ....... 714/47.2, 25, 26, 47.1, 47.3, 48, 49, 57
See application file for complete search history.

(56) References Cited

U.S. PATENT DOCUMENTS

| | | | | |
|---|---|---|---|---|
| 2007/0067678 | A1* | 3/2007 | Hosek | G05B 23/0235 714/25 |
| 2007/0101202 | A1* | 5/2007 | Garbow | G06F 11/008 714/47.2 |
| 2009/0022626 | A1 | 1/2009 | Tanoue et al. | |
| 2009/0306908 | A1* | 12/2009 | Foucher | G01D 9/005 702/34 |

FOREIGN PATENT DOCUMENTS

| | | | |
|---|---|---|---|
| JP | 09-289508 | A | 11/1997 |
| JP | 2004-118371 | A | 4/2004 |
| JP | 2007-087232 | A | 4/2007 |
| JP | 2007-304759 | A | 11/2007 |
| JP | 2007-324941 | A | 12/2007 |
| JP | 2009-025167 | A | 2/2009 |
| JP | 2009-199321 | A | 9/2009 |
| JP | 2009-251672 | A | 10/2009 |
| JP | 4852734 | B1 | 1/2012 |
| JP | 2012-068826 | A | 4/2012 |

\* cited by examiner

| PARAMETER | 1 | 2 | 3 | 4 | 5 | 6 | 7 |
|---|---|---|---|---|---|---|---|
| PARAMETER 1 | A | C | A | C | A | A | A |
| PARAMETER 2 | B | D | B | D | E | B | B |

RELATED ART

FIG.1A

| RULE |
|---|
| B IF PARAMETER 1 IS A |
| D IF PARAMETER 1 IS C |

RELATED ART

FIG.1B

| PARAMETER | 1 | 2 | 3 | 4 | 5 | 6 | 7 |
|---|---|---|---|---|---|---|---|
| PARAMETER 1 | A | C | A | C | A | A | A |
| PARAMETER 2 | B | D | B | D | (E) | B | B |

RELATED ART

FIG.1C

| PARAMETER | SERVER 1 | SERVER 2 | SERVER 3 | SERVER 4 |
|---|---|---|---|---|
| Region | JP | AU | SG | US |
| nameserver | 192.168.1.1 | 192.168.1.1 | 192.168.1.1 | 192.168.1.1 |
| LANG | jp | en | en | en |
| UTC | FALSE | TRUE | TRUE | TRUE |
| BOOTPROTO | dhcp | static | static | static |

FIG.3

| PARAMETER | SERVER 1 | SERVER 2 | SERVER 3 | SERVER 4 |
|---|---|---|---|---|
| Region | JP | AU | SG | US |
| nameserver | 192.168.3.1 | 192.168.3.1 | 192.168.1.1 | 192.168.1.1 |
| LANG | jp | jp | jp | jp |
| UTC | FALSE | FALSE | TRUE | TRUE |
| BOOTPROTO | dhcp | dhcp | static | static |

FIG.5

| PARAMETER | SERVER 1 | SERVER 2 | SERVER 3 | SERVER 4 | FEATURE VALUE |
|---|---|---|---|---|---|
| Region | JP | AU | SG | US | 1 |
| nameserver | 192.168.1.1 | 192.168.1.1 | 192.168.1.1 | 192.168.1.1 | 0 |
| LANG | jp | en | en | en | 0.406 |
| UTC | FALSE | TRUE | TRUE | TRUE | 0.406 |
| BOOTPROTO | dhcp | static | static | static | 0.406 |

FIG.6

| PARAMETER | SERVER 1 | SERVER 2 | SERVER 3 | SERVER 4 | FEATURE VALUE |
|---|---|---|---|---|---|
| Region | JP | AU | SG | US | 1 |
| nameserver | 192.168.3.1 | 192.168.3.1 | 192.168.1.1 | 192.168.1.1 | 0.5 |
| LANG | jp | jp | jp | jp | 0 |
| UTC | FALSE | FALSE | TRUE | TRUE | 0.5 |
| BOOTPROTO | dhcp | dhcp | static | static | 0.5 |

FIG.8

| PARAMETER | SERVER 1 | SERVER 2 | SERVER 3 | SERVER 4 | FEATURE VALUE |
|---|---|---|---|---|---|
| Region | JP | AU | SG | US | JP,AU,SG,US (25) |
| nameserver | 192.168.1.1 | 192.168.1.1 | 192.168.1.1 | 192.168.1.1 | 192.168.1.1 (100) |
| LANG | jp | en | en | en | jp (25), en (75) |
| UTC | FALSE | TRUE | TRUE | TRUE | FALSE (25),TRUE (75) |
| BOOTPROTO | dhcp | static | static | static | dhcp (25),static (75) |

FIG.7

| PARAMETER | SERVER 1 | SERVER 2 | SERVER 3 | SERVER 4 | FEATURE VALUE |
|---|---|---|---|---|---|
| Region | JP | AU | SG | US | JP,AU,SG,US (25) |
| nameserver | 192.168.3.1 | 192.168.3.1 | 192.168.1.1 | 192.168.1.1 | 192.168.3.1 (50)<br>192.168.1.1 (50) |
| LANG | jp | jp | jp | jp | jp (100) |
| UTC | FALSE | FALSE | TRUE | TRUE | FALSE (50),TRUE (50) |
| BOOTPROTO | dhcp | dhcp | static | static | dhcp (50),static (50) |

FIG.9

| PARAMETER | ABSOLUTE VALUE OF DIFFERENCE BETWEEN FEATURE VALUES |
|---|---|
| Region | 0 |
| nameserver | 0.5 |
| LANG | 0.406 |
| UTC | 0.094 |
| BOOTPROTO | 0.094 |

FIG.10

| PARAMETER | ABSOLUTE VALUE OF DIFFERENCE BETWEEN FEATURE VALUES |
|---|---|
| Region | JP,AU,SG,US (0) |
| nameserver | 192.168.3.1 (50)<br>192.168.1.1 (50) |
| LANG | jp (75), en (75) |
| UTC | FALSE (25),TRUE (25) |
| BOOTPROTO | dhcp (25),static (25) |

FIG.11

| PARAMETER | SERVER 1 | SERVER 2 | SERVER 3 | SERVER 4 | ABSOLUTE VALUE OF DIFFERENCE BETWEEN FEATURE VALUES |
|---|---|---|---|---|---|
| Region | JP | AU | SG | US | 0 |
| nameserver | 192.168.3.1 | 192.168.3.1 | 192.168.1.1 | 192.168.1.1 | 0.5 |
| LANG | jp | jp | jp | jp | 0.406 |
| UTC | FALSE | FALSE | TRUE | TRUE | 0.094 |
| BOOTPROTO | dhcp | dhcp | static | static | 0.094 |

FIG.12

| PARAMETER | SERVER 1 | SERVER 2 | SERVER 3 | SERVER 4 | ABSOLUTE VALUE OF DIFFERENCE BETWEEN FEATURE VALUES |
|---|---|---|---|---|---|
| Region | JP | AU | SG | US | JP,AU,SG,US (0) |
| nameserver | 192.168.3.1 | 192.168.3.1 | 192.168.1.1 | 192.168.1.1 | 192.168.3.1 (50)<br>192.168.1.1 (50) |
| LANG | jp | jp | jp | jp | jp (75), en (75) |
| UTC | FALSE | FALSE | TRUE | TRUE | FALSE (25),TRUE (25) |
| BOOTPROTO | dhcp | dhcp | static | static | dhcp (25),static (25) |

FIG.13

| PARAMETER | SERVER 1 | SERVER 2 | SERVER 3 | SERVER 4 | FEATURE VALUE |
|---|---|---|---|---|---|
| Region | JP | AU | SG | US | 1 |
| nameserver | 192.168.3.1 | 192.168.3.1 | 192.168.3.1 | 192.168.3.1 | 0 |
| LANG | jp | jp | jp | en | 0.406 |
| UTC | FALSE | FALSE | TRUE | TRUE | 0.5 |
| BOOTPROTO | dhcp | dhcp | static | static | 0.5 |

FIG.14

| PARAMETER | ABSOLUTE VALUE OF DIFFERENCE BETWEEN FEATURE VALUES |
|---|---|
| Region | 0 |
| nameserver | 0 |
| LANG | 0 |
| UTC | 0.094 |
| BOOTPROTO | 0.094 |

FIG.15

| PARAMETER | ABSOLUTE VALUE OF DIFFERENCE BETWEEN FEATURE VALUES |
|---|---|
| Region | JP,AU,SG,US (0) |
| nameserver | 192.168.3.1 (100)<br>192.168.1.1 (100) |
| LANG | jp (50), en (50) |
| UTC | FALSE (25),TRUE (25) |
| BOOTPROTO | dhcp (25),static (25) |

FIG.16

| PARAMETER | SERVER 1 | SERVER 2 | SERVER 3 | SERVER 4 | FEATURE VALUE |
|---|---|---|---|---|---|
| Region | JP | AU | SG | US | JP,AU,SG,US (1) |
| nameserver | 192.168.1.1 | 192.168.1.1 | 192.168.1.1 | 192.168.1.1 | 192.168.1.1 (1) |
| LANG | jp | en | en | en | jp (2), en (1) |
| UTC | FALSE | TRUE | TRUE | TRUE | FALSE (2),TRUE (1) |
| BOOTPROTO | dhcp | static | static | static | dhcp (2),static (1) |

FIG.19

| PARAMETER | SERVER 1 | SERVER 2 | SERVER 3 | SERVER 4 | FEATURE VALUE |
|---|---|---|---|---|---|
| Region | JP | AU | SG | US | JP,AU,SG,US |
| nameserver | 192.168.1.1 | 192.168.1.1 | 192.168.1.1 | 192.168.1.1 | 192.168.1.1 |
| LANG | jp | en | en | en | en |
| UTC | FALSE | TRUE | TRUE | TRUE | TRUE |
| BOOTPROTO | dhcp | static | static | static | static |

FIG.20

| PARAMETER | SERVER 1 | SERVER 2 | SERVER 3 | SERVER 4 | FEATURE VALUE |
|---|---|---|---|---|---|
| Region | JP | AU | SG | US | JP,AU,SG,US (1) |
| nameserver | 192.168.3.1 | 192.168.3.1 | 192.168.3.1 | 192.168.3.1 | 192.168.3.1 (1) |
| LANG | jp | jp | jp | en | jp (1),en (2) |
| UTC | FALSE | FALSE | TRUE | TRUE | FALSE (1),TRUE (1) |
| BOOTPROTO | dhcp | dhcp | static | static | dhcp (1),static (1) |

FIG.21

| PARAMETER | SERVER 1 | SERVER 2 | SERVER 3 | SERVER 4 | FEATURE VALUE |
|---|---|---|---|---|---|
| Region | JP | AU | SG | US | JP,AU,SG,US |
| nameserver | 192.168.3.1 | 192.168.3.1 | 192.168.3.1 | 192.168.3.1 | 192.168.3.1 |
| LANG | jp | jp | jp | en | jp |
| UTC | FALSE | FALSE | TRUE | TRUE | FALSE,TRUE |
| BOOTPROTO | dhcp | dhcp | static | static | dhcp,static |

FIG.22

| PARAMETER | SERVER 1 | SERVER 2 | SERVER 3 | SERVER 4 | CHANGE OF FEATURE VALUE |
|---|---|---|---|---|---|
| Region | JP | AU | SG | US | – |
| nameserver | 192.168.3.1 | 192.168.3.3 | 192.168.1.3 | 192.168.1.3 | YES |
| LANG | jp | jp | jp | en | YES |
| UTC | FALSE | FALSE | TRUE | TRUE | YES |
| BOOTPROTO | dhcp | dhcp | static | static | YES |

FIG.23

| PARAMETER | SERVER 1 | SERVER 2 | SERVER 3 | SERVER 4 | CHANGE OF FEATURE VALUE |
|---|---|---|---|---|---|
| Region | JP | AU | SG | US | – |
| nameserver | 192.168.3.1 | 192.168.3.1 | 192.168.3.1 | 192.168.3.1 | YES |
| LANG | jp | jp | jp | en | YES |
| UTC | FALSE | FALSE | TRUE | TRUE | YES |
| BOOTPROTO | dhcp | dhcp | static | static | YES |

FIG.24

INFORMATION PROCESSING TECHNIQUE FOR SUPPORTING DATA SETTING

CROSS-REFERENCE TO RELATED APPLICATIONS

This application is a continuing application, filed under 35 U.S.C. section 111(a), of International Application PCT/JP2012/064143, filed on May 31, 2012, the entire contents of which are incorporated herein by reference.

FIELD

This technique relates to a technique for checking setting information for apparatuses or the like.

BACKGROUND

In a large-scale system such as a cloud system, there are a lot of cases where registration and/or change of the setting information such as a host name and gateway are performed. Therefore, there is a possibility that a lot of troubles such as system failures, which are caused by setting mistakes, occur, however, the reduction of the setting mistakes by human check is limited.

The cloud system includes servers, which are grouped by various kinds of units such as server units, rack units, which respectively include one or plural servers, island units that respectively include one or plural racks, and region units. Typically, for each unit, its setting is almost homogenized.

In order to decrease the setting mistakes, there is a method for extracting a rule that holds true for most of setting parameters, and further routinely extracting setting parameters that do not conform with the extracted rule as an error candidate. For example, data as illustrated in FIG. 1A is assumed. In other words, setting values for parameters 1 and 2 are set for each of setting targets 1 to 7. In such a case, as depicted in a portion surrounded by a dotted line in FIG. 1A, a first rule is extracted that if parameter 1 is "A", parameter 2 is "B", and as depicted in a portion surrounded by a dash dotted line in FIG. 1A, a second rule is extracted that if the parameter 1 is "C", the parameter 2 is "D", as depicted in FIG. 1B. When the first and second rules are applied to data illustrated in FIG. 1A, it can be understood that the setting target "5" is contrary to the first rule, because the parameter 1 is "A", however, the parameter 2 is "E", as illustrated in FIG. 1C. Therefore, because the setting value of the parameter 2 for the setting target "5" has a possibility of the error, it is possible to display, as an error candidate, the setting value of the parameter 2 for the user.

In such a conventional technique, because a rule is generated based on data after setting changes, a rule to appropriately determine the setting error cannot be extracted in a situation that a parameter value for a certain parameter is erroneously set for most of servers. In an example of FIG. 1A, when "A" for the parameter 1 is set for all setting targets, a rule "if parameter 1 is C, parameter 2 is D" is not generated, and the setting targets "2", "4" and "5" are identified as the setting error candidates.

Currently, in order to reduce the cost and improve the reliability, the automation of the system design and setting change is advanced, and the number of cases increases that a parameter value for a specific setting target is copied and pasted to other setting targets. In such a case, when the parameter value for the specific setting target is wrong, the wrong value is spread to the entire system. However, according to the aforementioned conventional technique, any rule is not appropriately generated, therefore, such a case cannot be handled.

Patent Document 1: Japanese examined Patent application Publication No. 06-1423

Patent Document 2: Japanese Laid-open Patent Publication No. 2004-118371

Patent Document 3: Japanese Laid-open Patent Publication No. 09-289508

Patent Document 4: Japanese Laid-open Patent Publication No. 2007-324941

In other words, there is no technique for appropriately detecting mistakes in the setting change, which occur for most of setting targets.

SUMMARY

An information processing method relating to this technique includes (A) first extracting a first feature value for each of a plural parameters from first data that is data after at least one parameter value, which is included in second data that includes, for each of plural setting targets, each parameter value for each of the plural parameters, was changed; and (B) second extracting a parameter that is a candidate of an erroneously changed parameter based on a difference between a second feature value that is extracted, for each of the plural parameters, from the second data and a corresponding first feature value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1A is a diagram depicting a configuration example of a system;

FIG. 1B is a diagram depicting examples of extracted rules;

FIG. 1C is a diagram depicting a configuration example of a system;

FIG. 3 is a diagram depicting an example of present setting data (setting data before change);

FIG. 5 is a diagram depicting an example of setting data after change;

FIG. 6 is a diagram depicting an example of a feature value (average information content) extracted for the present setting data;

FIG. 7 is a diagram depicting an example of a feature value (setting ratio) extracted for the present setting data;

FIG. 8 is a diagram depicting an example of a feature value (average information content) extracted for the setting data after change;

FIG. 9 is a diagram depicting an example of a feature value (setting data) extracted for the setting data after change;

FIG. 10 is a diagram depicting an example of an absolute value of a difference between feature values in case where the feature value is the average information content;

FIG. 11 is a diagram depicting an example of an absolute value of a difference between feature values in case where the feature value is the setting ratio;

FIG. 12 is a diagram depicting an example of output data in case where the feature value is the average information content;

FIG. 13 is a diagram depicting an example of output data in case where the feature value is the setting ratio;

FIG. 14 is a diagram depicting another example of the setting data after change and the feature value (average information content);

FIG. 15 is a diagram depicting an example of a case where the absolute value of the difference between the feature values is calculated for the example in FIG. 14;

FIG. 16 is a diagram depicting an example of the absolute value of the difference between the feature values in case where the feature value is the setting ratio for the example in FIG. 14;

FIG. 19 is a diagram depicting an example of a feature value for the present setting data in case where the ranking of appearance frequency for each parameter value is used as the second feature value;

FIG. 20 is a diagram depicting an example of a feature value for the present setting data in case where the parameter value with the highest appearance frequency is used as the second feature value;

FIG. 21 is a diagram depicting an example of a feature value for the setting data after change in case where the ranking of the appearance frequency for each parameter value is used as the second feature value;

FIG. 22 is a diagram depicting an example of a feature value for the setting data after change in case where the parameter value with the highest appearance frequency is used as the second feature value;

FIG. 23 is a diagram depicting an example of output data in case where the ranking of the appearance frequency for each parameter value is used as the second feature value;

FIG. 24 is a diagram depicting an example of output data in case where the parameter value with the highest appearance frequency is used as the second feature value.

DESCRIPTION OF EMBODIMENTS

Embodiment 1

Figure 2:
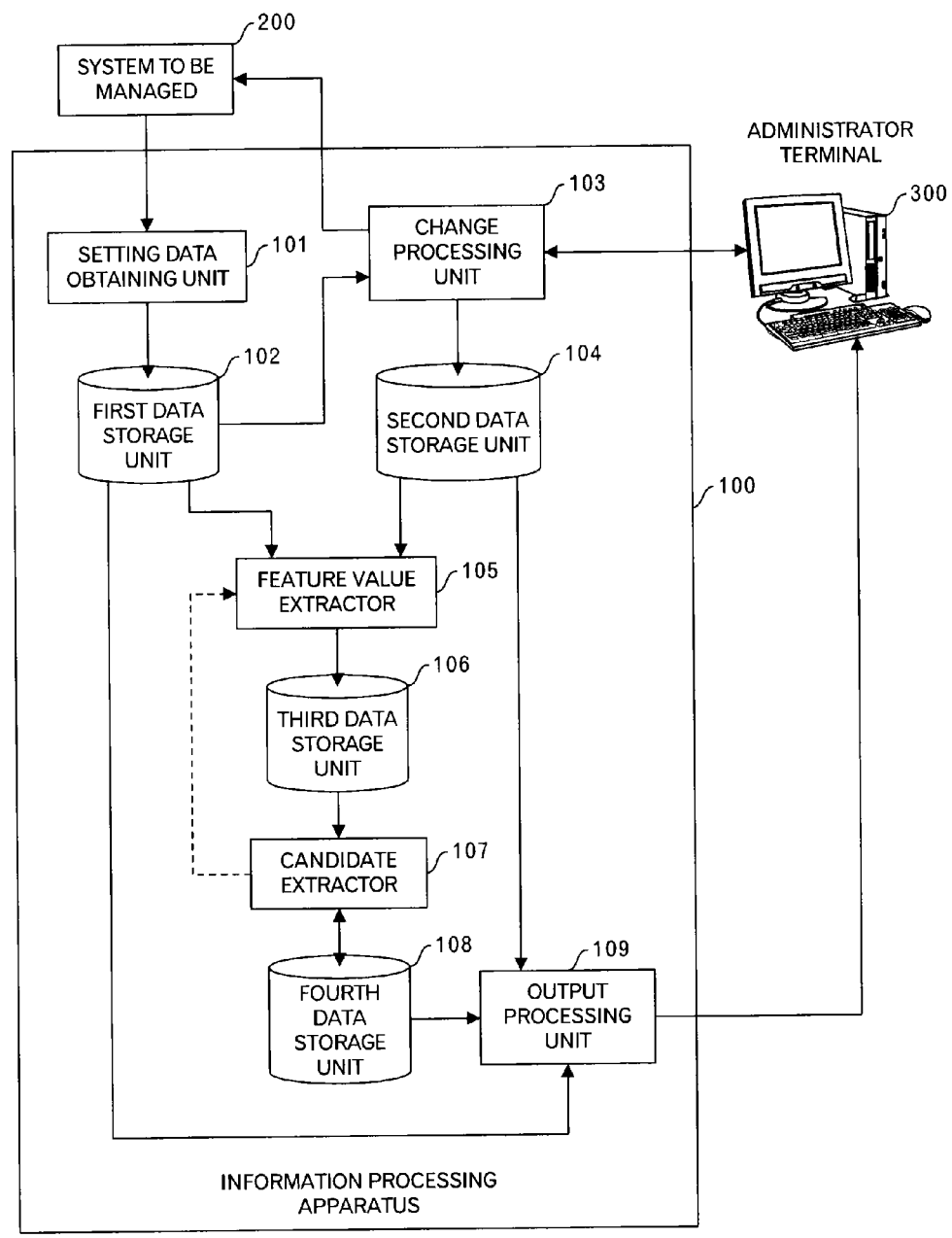
FIG. 2 is an outline diagram of a system.

FIG. 2 illustrates an outline of a system relating to an embodiment of this technique. The system relating to this embodiment includes an administrator terminal 300, an information processing apparatus 100 and a system 200 to be managed by the administrator. The information processing apparatus 100 includes a setting data obtaining unit 101, a first data storage unit 102, a change processing unit 103, a second data storage unit 104, a feature value extractor 105, a third data storage unit 106, a candidate extractor 107, a fourth data storage unit 108 and an output processing unit 109.

The setting data obtaining unit 101 obtains present setting data (also called "setting data before change") from the system 200 to be managed, and stores the obtained data in the first data storage unit 102. The present setting data may be obtained from a computer such as the administrator terminal 300. Moreover, the change processing unit 103 generates setting data after change according to an instruction from the administrator terminal 300, and stores the generated data in the second data storage unit 104.

The feature value extractor 105 extracts predetermined feature values from setting data before change and setting data after change, and stores the extracted feature values in the third data storage unit 106. The candidate extractor 107 extracts parameters as candidate of the setting errors based on data of the feature values stored in the third data storage unit 106, and stores data of the extraction result in the fourth data storage unit 108.

In this embodiment, the feature value is an indicator value that represents the setting status of parameter values for the respective parameters with respect to plural setting targets, more specifically, that represents the status of the deviation of the parameter values. For example, the feature value in this embodiment is average information content (=entropy), a setting ratio of the parameter value or the like.

The average information content is calculated by a following expression:

$$\Sigma_i \{-x_i \log_y x_i\}$$

$x_i$ represents an appearance probability of the parameter value i, and y represents the number of setting targets.

The output processing unit 109 generates data to be outputted to the administrator terminal 300 by using data stored in the first and second data storage units 102 and 104 and data stored in the fourth data storage unit 108, and outputs the generated data. The final setting data is outputted, for example, from the change processing unit 103 to the system 200 to be managed, and set in the system 200 to be managed.

The dotted line in FIG. 2 is not used in the first embodiment.

Next, processing contents of the system in FIG. 2 will be explained by using FIGS. 3 to 13. For example, in response to an instruction from the administrator terminal 300, the setting data obtaining unit 101 obtains the present setting data, for example, from the system 200 to be managed, and stores the obtained data in the first data storage unit 102. Moreover, the change processing unit 103 outputs the present setting data stored in the first data storage unit 102, for example to the administrator terminal 300, and the administrator terminal 300 causes the administrator to change the present setting data, which is outputted to the administrator.

For example, it is assumed that the present setting data is data as illustrated in FIG. 3. In an example of FIG. 3, for each of 4 servers, each parameter value of each setting parameter is set among setting parameters including a region "Region", an IP address of a name server "nameserver", a language "LANG", existence of utilization of UTC (Coordinated Universal Time) "UTC" and setting method of the IP address "BOOTPROTO".

Figure 4:
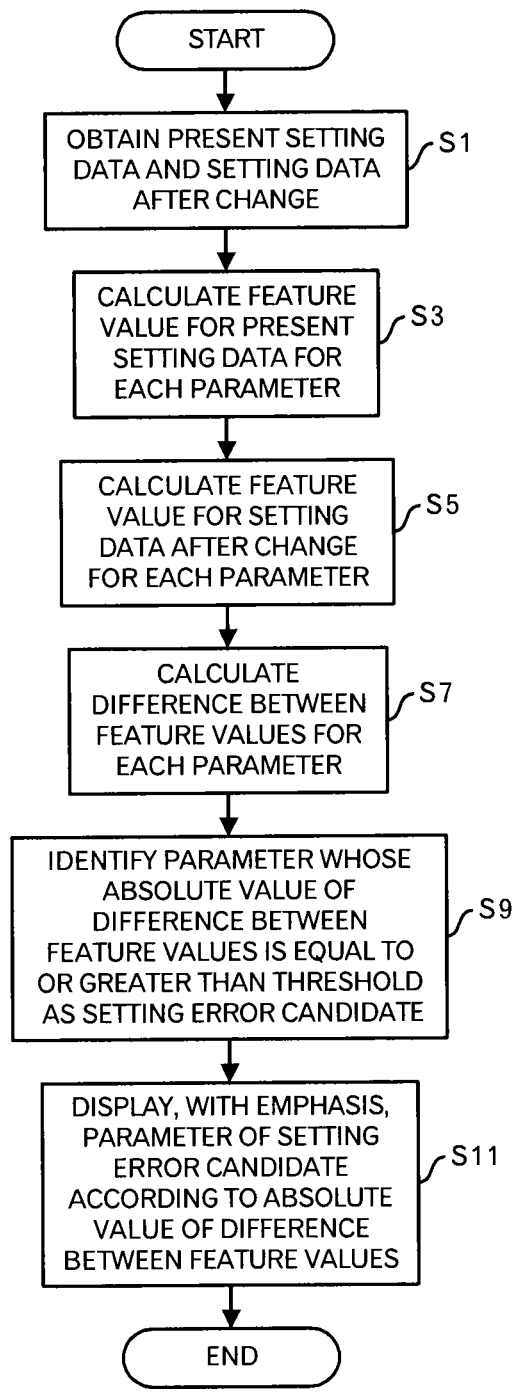
FIG. 4 is a diagram depicting a processing flow relating to a first embodiment.

The administrator operates the administrator terminal 300 to make change for such setting data, and the administrator terminal 300 outputs setting data after change to the change processing unit 103. The change processing unit 103 obtains the setting data after change from the administrator terminal 300, and stores the obtained data in the second data storage unit 104 (FIG. 4: step S1).

For example, it is assumed that the administrator changed the parameter value for "nameserver" of server 1 to "192.168.3.1". Next, it is assumed that parameter values for parameters other than "Region" of the server 1 were copied to the server 2, when copying parameter values for "UTC" and "BOOTPROTO" of the server 1 to server 2. Furthermore, it is assumed that the parameter value for "LANG" of the server 2, which was erroneously set, is also copied to the servers 3 and 4.

In such a case, the setting data as illustrated in FIG. 5 is stored in the second data storage unit 104. In FIG. 5, data surrounded by a thick line is data that is erroneously set.

Next, the feature value extractor 105 calculates, for each parameter, a feature value for the present setting data stored in the first data storage unit 102, and stores the calculated feature value in the third data storage unit 106 (step S3).

When the average information content of each parameter in the present setting data as illustrated in FIG. 3 is calculated, values as illustrated in FIG. 6 are obtained. Moreover, when a setting ratio of the parameter value is calculated, values as illustrated in FIG. 7 are obtained. In an example of FIG. 7, the numerical value within the parentheses depicted after the parameter value is the setting ratio in %. For example, the setting ratio of jp in "LANG" is 25%=¼*100.

Next, the feature value extractor 105 calculates, for each parameter, a feature value for the setting data after change, which is stored in the second data storage unit 104, and stores the calculated value in the third data storage unit 106 (step S5).

When the average information content for each parameter in the setting data after change as illustrated in FIG. 5 is calculated, values as illustrated in FIG. 8 are obtained. Moreover, when a setting ratio of the parameter value is calculated, values as illustrated in FIG. 9 are obtained.

Then, the candidate extractor 107 calculates an absolute value of a difference between the feature value for the present setting data and the feature value for the setting data after change (step S7), identifies, as setting error candidates, parameters whose the absolute value of the difference is equal to or greater than a threshold, and stores data of the absolute value of the difference between feature values and parameters of the identified setting error candidates in the fourth data storage unit 108 (step S9).

The absolute value of the difference between the average information content of the present setting data illustrated in FIG. 6 and the average information content of the setting data after change, which is illustrated in FIG. 8, is a value illustrated in FIG. 10. For example, when 0.35 is set as the threshold, the parameters "nameserver" and "LANG", which are surrounded by the thick line in FIG. 10, are identified as the parameters of the setting error candidates.

The absolute value of the difference between the setting ratio of the present setting data illustrated in FIG. 7 is the setting ratio of the setting data after change, which is illustrated in FIG. 9, is a value as illustrated in FIG. 11. For example, when 50 is set as the threshold, the parameters "nameserver" and "LANG", which are surrounded by the thick line in FIG. 11, are identified as the parameters of the setting error candidates. When one parameter includes plural parameter values, plural absolute values of the differences between feature values are obtained, however, in such a case, it is determined whether or not the greatest absolute value is equal to or greater than the threshold.

After that, the output processing unit 109 generates data to display, with emphasis, the parameters of the setting error candidates according to the absolute values of the differences between the feature values, which are stored in the fourth data storage unit 108, and to point out the parameter values that were changed, by using data stored in the first and second data storage units 102 and 104, and outputs the generated data to the administrator terminal 300 to cause the display apparatus to display the generated data (step S11).

When the administrator terminal 300 receives the output data from the output processing unit 109 of the information processing apparatus 100, the administrator terminal 300 outputs the output data to the display apparatus.

For example, when the feature value is the average information content, data as illustrated in FIG. 12 is displayed on the display apparatus of the administrator terminal 300. The hatching is attached to portions in which there is a difference between the present setting data and the setting data after change to represent the changed portions. Furthermore, in the column of the absolute value of the difference between the feature values, the deeper hatching is attached to a greater value, therefore, the parameter whose possibility of the error is high can be easily recognized.

Similarly, when the setting ratio is the feature value, data as illustrated in FIG. 13 is displayed on the display apparatus of the administrator terminal 300. Also in an example of FIG. 13, it can be easily recognized that "LANG" and "nameserver" are parameters whose possibility of the setting error is high. Furthermore, in the column of the absolute value of the difference between the feature values, the deeper hatching is attached to the greater value, therefore, the parameters whose possibility of the error is high can be easily recognized.

Thus, the administrator who operates the administrator terminal 300 can easily recognize the setting errors on changes that were performed by its own operations.

The administrator modifies setting data based on such output data again, and causes the administrator terminal 300 to send the data after modification to the change processing unit 103 of the information processing apparatus 100. When the change processing unit 103 receives the data after modification, the change processing unit 103 performs a processing to set the data after modification to the system 200 to be managed. Thus, correct setting parameters are set.

Thus, even when setting errors were made for most of the parameter values by copy and paste or the like, such a parameter can be detected.

Embodiment 2

For example, a case is assumed that the present setting data as illustrated in FIG. 3 is changed to the setting data as illustrated in FIG. 14. In such a case, the setting errors are in the portions surrounded by thick line in FIG. 14, in other words, the parameter values of "nameserver" for the servers 2, 3 and 4 and the parameter values of "LANG" for the servers 2 and 3.

In such a case, when the average information content is calculated as the feature value, the values as illustrated in FIG. 14 are obtained. On the other hand, the absolute value of the difference between the feature value of the present setting data and the feature value of the setting data after change is a value as illustrated in FIG. 15. In an example of FIG. 15, only value that are less than the threshold "0.35" are calculated for all parameters, and no parameters of the setting error candidates are extracted. When the feature value is the setting ratio, the absolute value of the difference between the feature values is obtained as illustrated in FIG. 16. In such a case, "LANG" and "nameserver" are extracted as the parameters, which are equal to or greater than the threshold "50". As described above, there is a case where the setting error cannot be detected depending on the type of the feature value. Therefore, this embodiment copes with such a case.

The system configuration in this embodiment is the same as that illustrated in FIG. 2 for the first embodiment. However, the dotted line is used.

Next, processing contents relating to this embodiment will be explained by using FIGS. 17 to 24.

For example, in response to an instruction from the administrator terminal 300, the setting data obtaining unit 101 obtains the present setting data from the system 200 to be managed, for example, and stores the obtained data in the first data storage unit 102. Moreover, the change processing unit 103 outputs the present setting data stored in the first data storage unit 102 to the administrator terminal 300, for example, and the administrator terminal 300 outputs the present setting data to cause the administrator to make changes.

Figure 17:
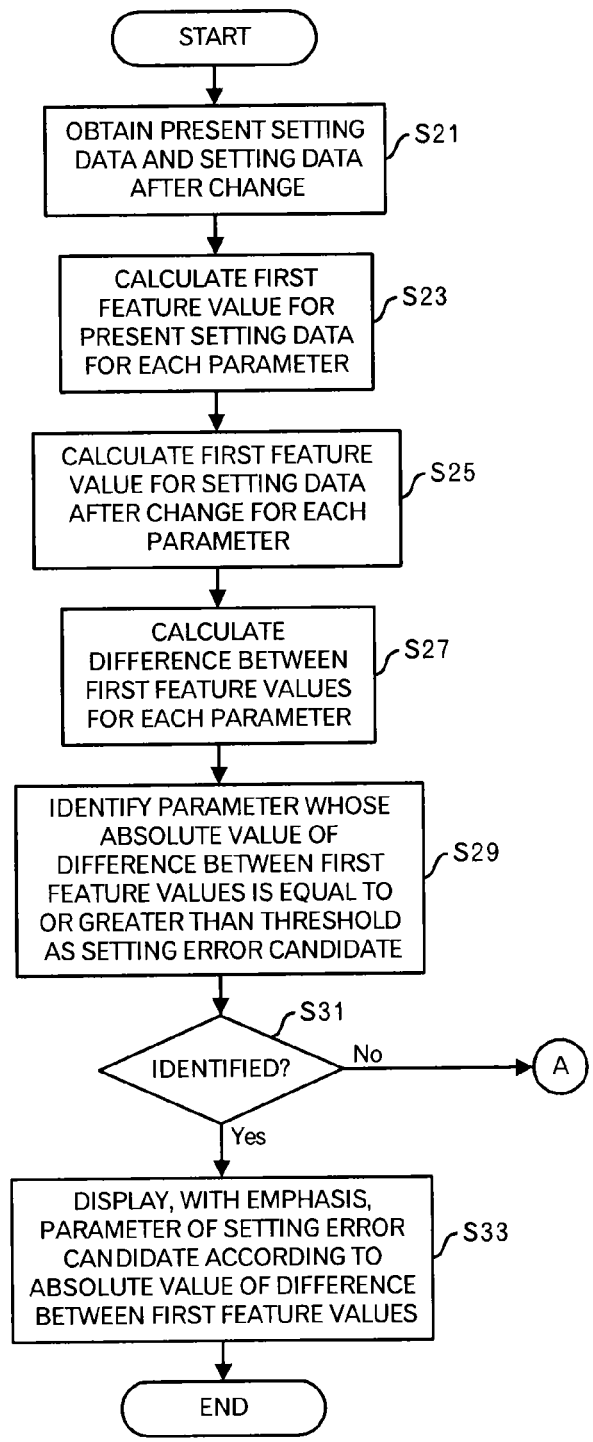
FIG. 17 is a diagram depicting a processing flow relating to a second embodiment.
Figure 18:
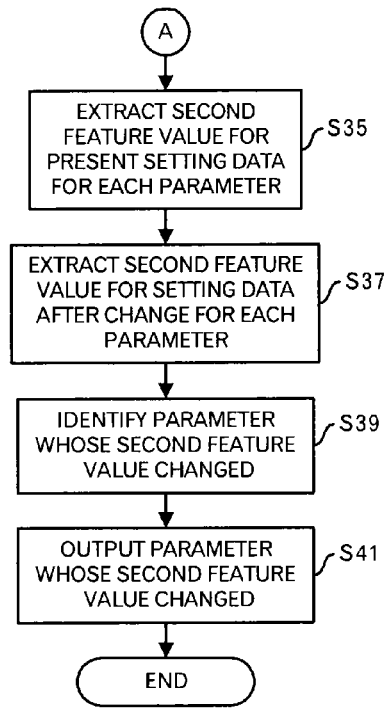
FIG. 18 is a diagram depicting a processing flow relating to the second embodiment.

The administrator operates the administrator terminal 300 to make changes for such setting data, and the administrator terminal 300 outputs the setting data after change to the change processing unit 103. The change processing unit 103 obtains the setting data after change from the administrator terminal 300, and stores the obtained data in the second data storage unit 104 (FIG. 17: step S21).

Next, the feature value extractor 105 calculates, for each parameter, a first feature value for the present setting data stored in the first data storage unit 102, and stores the first feature value in the third data storage unit 106 (step S23).

Moreover, the feature value extractor 105 calculates, for each parameter, a first feature value for the setting data after change, which is stored in the second data storage unit 104, and stores the first feature value in the third data storage unit 106 (step S25).

Then, the candidate extractor 107 calculates an absolute value of a difference between the first feature value for the present setting data and the first feature value for the setting data after change, and stores the calculated value in the fourth data storage unit 108 (step S27).

As described above, when the average information content is calculated as the first feature value, the absolute value of the difference between the feature values illustrated in FIG. 15 is obtained. Similarly, when the setting ratio is calculated as the first feature value, the absolute value of the difference between the feature values illustrated in FIG. 16 is obtained.

Furthermore, the candidate extractor 107 identifies, as the setting error candidates, parameters whose absolute value of the difference between the first feature values is equal to or greater than the threshold, and stores data of the parameters of the setting error candidates in the fourth data storage unit 108 if they are identified (step S29).

When the setting error candidates are identified as in case where the setting ratio is calculated as the first feature value (step S31: Yes route), the output processing unit 109 generates data to display, with emphasis, the parameters of the setting error candidates according to the absolute value of the difference between the first feature values, which is stored in the fourth data storage unit 108, and to point out the parameter values for which any change was made, by using data stored in the first and second data storage units 102 and 104, and outputs the generated data to the administrator terminal 300 to cause the administrator terminal 300 to display the generated data on the display apparatus (step S33).

When it is possible to identify the setting error candidates by the first feature values, the same processing as that in the first embodiment is performed.

On the other hand, when the setting error candidates cannot be identified as in case where the average information content is calculated as the first feature value (step S31: No route), the processing shifts to a processing in FIG. 18 through terminal A.

In such a case, the candidate extractor 107 instructs the feature value extractor 105 to change the type of the feature value. In this embodiment, as the second feature value, the ranking of the appearance frequency for each parameter value, a parameter value with the highest appearance frequency or the like is used. There values are also indicator values that represent the status of the deviation of the parameter values.

Then, the feature value extractor 105 calculates, for each parameter, a second feature value for the present setting data stored in the first data storage unit 102, and stores the second feature value in the third data storage unit 106 (step S35).

For example, when the ranking of the appearance frequency for each parameter value is used as the second feature value, data as illustrated in FIG. 19 is obtained. In this example, there are one or two parameter values for each parameter. Therefore, the ranking is first or second.

On the other hand, when the parameter values with the highest appearance frequency is used as the second feature value, data as illustrated in FIG. 20 is obtained. When the appearance frequency is the same, all corresponding parameter values are extracted.

Moreover, the feature value extractor 105 calculates, for each parameter, the second feature value for the setting data after change, which is stored in the second data storage unit 104 and stores the second feature value in the third data storage unit 106 (step S37).

For example, when the ranking of the appearance frequency for each parameter value is used as the second feature value, data as illustrated in FIG. 21 is obtained. Moreover, when the parameter value with the highest appearance frequency is used as the second feature value, data as illustrated in FIG. 22 is obtained.

Then, the candidate extractor 107 identifies a parameter whose second feature value varied, and stores data of the identified parameter in the fourth data storage unit 108 (step S39).

When the ranking of the appearance frequency for each parameter value is used as the second feature value, parameters other than "Region" are identified. A parameter whose parameter value, which has not appeared, is ranked in addition to the change of the ranking may specially be extracted. According to the examples of FIGS. 19 and 21, "nameserver" is identified.

Moreover, when the parameter value with the highest appearance frequency is used as the second feature value, parameters other than "Region" are identified. In such a case, a parameter whose parameter values are completely changed may be specially extracted. According to the examples in FIGS. 20 and 22, "nameserver" and "LANG" are extracted.

Then, the output processing unit 109 generates data to display, with emphasis, the parameters whose second feature values varied and which is stored in the fourth data storage unit 108, and to point out the parameter values, which were changed, by using data stored in the first and second data storage units 102 and 104, and output the data to the administrator terminal 300 to cause the administrator terminal 300 to display the data on the display apparatus (step S41).

When the ranking of the appearance frequency for each parameter value is used as the second feature value, data illustrated in FIG. 23 is displayed on the display apparatus of the administrator terminal 300, for example. In FIG. 23, as for the parameters whose second feature values change, the change is pointed out as representing "yes", and as for the parameters whose parameter value, which has not appeared, is ranked, the hatching is attached in order to call the user's attention to such parameters.

Similarly, when the parameter value with the highest appearance frequency is used as the second feature value, data as illustrated, for example, in FIG. 24 is displayed on the display apparatus of the administrator terminal 300. In an example of FIG. 24, as for the parameters whose second feature values changed, the changes are pointed out by representing "yes", and as for the parameters whose parameter values, which were completely changed, the hatching is attached in order to call the user's attention to the parameters.

By pointing out problems, which cannot be identified by the first feature values, with the second feature values, by doing such a processing, it becomes possible to grasp the setting error.

Although the embodiments of this technique were explained, this technique is not limited to those.

For example, an example of the second feature value in the second embodiment, the ranking of the appearance frequency for each parameter value or parameter values with the highest appearance frequency is used, however, the setting ratio may be employed. In such a case, an absolute value of a difference between the second feature values is similarly calculated to use it in the processing.

Moreover, the functional block diagram is a mere example, and does not always correspond to a program module configuration. Similarly, as for the processing flow, as long as the processing results do not change, the turns of the steps may be exchanged, and plural steps may be executed in parallel. Furthermore, as for the configuration of data storage units, more data storage units may be used, or the data storage units may be integrated in one data storage unit.

Figure 25:
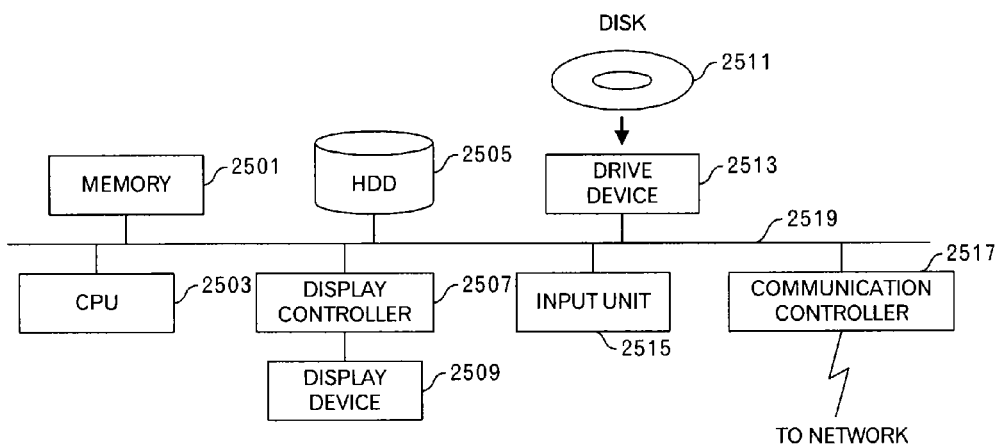
FIG. 25 is a functional block diagram of a computer.

In addition, the aforementioned an information processing apparatus 100 is a computer device as illustrated in FIG. 25. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 25. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

An information processing method relating to the embodiments includes: (A) first extracting a first feature value for each of plural parameters from first data that is data after at least one parameter value, which is included in second data that includes, for each of plural setting targets, each parameter value for each of the plural parameters, was changed, wherein the first data is stored in a data storage unit; and (B) second extracting a parameter that is a candidate of an erroneously changed parameter based on a difference between a second feature value that is extracted, for each of the plural parameters, from the second data and is stored in the data storage unit and a corresponding first feature value, and storing the extracted parameter in the data storage unit.

By using the difference between the feature value for the present setting data and the feature value for the setting data after change, it is possible to appropriately detect mistakes of the setting change, which occur in most of the setting targets.

Moreover, the aforementioned second extracting may include extracting a parameter whose absolute value of a difference between the second feature value and the corresponding first feature value is equal to or greater than a threshold. By executing this processing, it is possible to extract the candidate of the erroneously changed parameter, quantitatively.

Furthermore, the aforementioned information processing method may further include: emphasizing the extracted parameter according to an absolute value of a difference between the second feature value and the corresponding first feature value is equal to or greater than a threshold. Thus, it becomes possible for an administrator to easily grasp problems.

Moreover, each of the first feature value and the second feature value may be an average information content, a ratio of a parameter value, a ranking of a parameter in an appearance frequency, or a parameter value whose appearance frequency is ranked as being the first. Accordingly, the feature value is an indicator value that represents the setting status of the parameter values for each parameter with respect to plural setting targets, more specifically, the status of the deviation of the parameter value.

Furthermore, the aforementioned information processing method may further include: upon detecting that no parameter is extracted in the second extracting, extracting a first feature value of another kind for each of the plural parameters from the first data; and extracting a parameter that is a candidate of the erroneously changed parameter based on a difference between a second feature value of the another kind, which is extracted, for each of the plural parameters, from the second data, and a corresponding first feature value of the another kind and storing the extracted data in the data storage unit. For example, the average information content may not change depending on the method of the change, therefore, the feature value of another kind is used in order to extract the candidate of the erroneously changed parameter.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program for causing a computer to execute a process, the process comprising:

first extracting a first feature value for each of a plurality of parameters from first data that is data after at least one parameter value, which is included in second data that includes, for each of a plurality of setting targets, each parameter value for each of the plurality of parameters, was changed;

second extracting a parameter that is a candidate of an erroneously changed parameter based on a difference between a second feature value that is extracted, for each of the plurality of parameters, from the second data and a corresponding first feature value; and emphasizing the extracted parameter according to whether an absolute value of a difference between the second feature value and the corresponding first feature value is equal to or greater than a first threshold.

2. The non-transitory computer-readable storage medium as set forth in claim 1, wherein the second extracting comprises:

extracting a parameter whose absolute value of a difference between the second feature value and the corresponding first feature value is equal to or greater than a second threshold.

3. The non-transitory computer-readable storage medium as set forth in claim 1, wherein each of the first feature value and the second feature value is an average information content, a ratio of a parameter value, a ranking of a parameter in an appearance frequency, or a parameter value whose appearance frequency is ranked as being the first.

4. The non-transitory computer-readable storage medium as set forth in claim 1, wherein the process further comprises:

upon detecting that no parameter is extracted in the second extracting, extracting a first feature value of another kind for each of the plurality of parameters from the first data; and extracting a parameter that is a candidate of the erroneously changed parameter based on a difference between a second feature value of the another kind, which is extracted, for each of the plurality of parameters, from the second data, and a corresponding first feature value of the another kind and storing the extracted parameter in a data storage unit.

5. The non-transitory computer-readable storage medium as set forth in claim 1, wherein the process further comprises:

generating display data including the extracted parameter.

6. The non-transitory computer-readable storage medium as set forth in claim 5, wherein the emphasizing includes applying predetermined graphical effect to the extracted parameter in the generated display data to differentiate the extracted parameter from other parameters included in the display data.

7. An information processing method, comprising:

first extracting, by using a computer, a first feature value for each of a plurality of parameters from first data that is data after at least one parameter value, which is included in second data that includes, for each of a plurality of setting targets, each parameter value for each of the plurality of parameters, was changed;

second extracting, by using the computer, a parameter that is a candidate of an erroneously changed parameter based on a difference between a second feature value that is extracted, for each of the plurality of parameters, from the second data and a corresponding first feature value; and emphasizing, by using the computer, the extracted parameter according to whether an absolute value of a difference between the second feature value and the corresponding first feature value is equal to or greater than a threshold.

8. An information processing apparatus, comprising:

a memory; and a processor configured to use the memory and execute a process, the process comprising:

first extracting a first feature value for each of a plurality of parameters from first data that is data after at least one parameter value, which is included in second data that includes, for each of a plurality of setting targets, each parameter value for each of the plurality of parameters, was changed;

second extracting a parameter that is a candidate of an erroneously changed parameter based on a difference between a second feature value that is extracted, for each of the plurality of parameters, from the second data and a corresponding first feature value; and emphasizing the extracted parameter according to whether an absolute value of a difference between the second feature value and the corresponding first feature value is equal to or greater than a threshold.

* * * * *